United States Patent
Koeckritz et al.

(10) Patent No.: US 11,085,149 B2
(45) Date of Patent: Aug. 10, 2021

(54) CLOTHING FOR A MACHINE FOR PRODUCING FIBER-CEMENT COMPONENTS AND PRODUCTION METHOD FOR A CLOTHING OF THIS TYPE

(71) Applicant: VOITH PATENT GMBH, Heidenheim (DE)

(72) Inventors: Uwe Koeckritz, Heidenheim (DE); Bob Crook, Wilson, NC (US)

(73) Assignee: Voith Patent GmbH, Heidenheim (DE)

( * ) Notice: Subject to any disclaimer, the term of this patent is extended or adjusted under 35 U.S.C. 154(b) by 0 days.

(21) Appl. No.: 17/254,406

(22) PCT Filed: May 21, 2019

(86) PCT No.: PCT/EP2019/063025
§ 371 (c)(1),
(2) Date: Dec. 21, 2020

(87) PCT Pub. No.: WO2019/242961
PCT Pub. Date: Dec. 26, 2019

(65) Prior Publication Data
US 2021/0164159 A1    Jun. 3, 2021

Related U.S. Application Data

(60) Provisional application No. 62/687,918, filed on Jun. 21, 2018.

(51) Int. Cl.
*D21F 7/08* (2006.01)
*D21F 1/00* (2006.01)
(Continued)

(52) U.S. Cl.
CPC ............ *D21F 1/0036* (2013.01); *C08L 23/12* (2013.01); *D03D 15/41* (2021.01); *D03D 15/47* (2021.01); *D21F 7/083* (2013.01)

(58) Field of Classification Search
CPC ..................................... D21F 1/00; D21F 7/08
See application file for complete search history.

(56) References Cited

U.S. PATENT DOCUMENTS 3,874,160 A * 4/1975 Kitazawa ............. D02G 1/0253
57/284
4,086,751 A * 5/1978 Hino .................... D02G 1/0253
57/288
(Continued)

FOREIGN PATENT DOCUMENTS

DE        1959574 A1    6/1971
DE        3215825 A1    12/1982
(Continued)

*Primary Examiner* — Andrew T Piziali
(74) *Attorney, Agent, or Firm* — Laurence A. Greenberg; Werner H. Stemer; Ralph E. Locher

(57) ABSTRACT

A clothing for a machine for producing fiber cement components includes a basic fabric having MD yarns and CD yarns. At least some of the MD yarns are formed from first multifilaments of a first material and second multifilaments twisted therewith of a second material. The first material has a higher tensile strength and a higher melting temperature than the second material. The MD yarns are heat-treated at a temperature between the melting temperature of the second material and the melting temperature of the first material, so that the at least partially melted second material forms a matrix after cooling, in which the first multifilaments of the first material are embedded. A method for producing the clothing is also provided.

18 Claims, 1 Drawing Sheet

(51) Int. Cl.
 *C08L 23/12* (2006.01)
 *D03D 15/41* (2021.01)
 *D03D 15/47* (2021.01)

(56) References Cited

U.S. PATENT DOCUMENTS

| | | | |
|---|---|---|---|
| 4,467,839 A | 8/1984 | Westhead | |
| 5,549,967 A * | 8/1996 | Gstrein | B32B 5/26 |
| | | | 442/200 |
| 5,618,624 A * | 4/1997 | Dinger | D03D 27/00 |
| | | | 428/368 |
| 5,658,662 A * | 8/1997 | Leumer | C08G 63/6926 |
| | | | 264/211.12 |
| 6,117,548 A * | 9/2000 | Swers | D02G 3/402 |
| | | | 428/370 |
| 2004/0014386 A1* | 1/2004 | Soelch | D21F 1/0027 |
| | | | 442/199 |
| 2004/0065072 A1* | 4/2004 | Zhu | D02G 3/28 |
| | | | 57/314 |
| 2007/0123126 A1* | 5/2007 | Shimazaki | D03D 1/0005 |
| | | | 442/59 |
| 2007/0155272 A1 | 7/2007 | Baumgartner et al. | |
| 2008/0182471 A1* | 7/2008 | Danzey | D02G 3/36 |
| | | | 442/199 |
| 2015/0050438 A1* | 2/2015 | Ogata | D04B 21/16 |
| | | | 428/35.2 |
| 2018/0162695 A1* | 6/2018 | Eastman | B32B 27/30 |

FOREIGN PATENT DOCUMENTS

| | | |
|---|---|---|
| DE | 4229546 A1 | 3/1994 |
| DE | 102007047880 A1 | 6/2009 |
| DE | 102008001150 A1 | 10/2009 |
| WO | 2006052689 A2 | 5/2006 |

* cited by examiner

CLOTHING FOR A MACHINE FOR PRODUCING FIBER-CEMENT COMPONENTS AND PRODUCTION METHOD FOR A CLOTHING OF THIS TYPE

BACKGROUND OF THE INVENTION

Field of the Invention

According to a first aspect, the invention relates to a clothing for a machine for producing fiber cement components, having a base fabric comprising MD yarns and CD yarns, wherein at least some of the MD yarns are formed from first multifilaments composed of a first material and from second multifilaments which are twisted therewith and which are composed of a second material, wherein the first material has a higher tensile strength and a higher melting temperature than the second material. According to a further aspect, the present invention relates to a production method for such a clothing.

A clothing of this kind is known from the document US 2007/0155272 A1, the content of which is hereby fully incorporated in the present application. In particular, reference is made to the methods, described in US 2007/0155272 A1, for producing fiber cement components, particularly to the Hatschek process, and also to the general construction of clothings, in particular of so-called fiber cement felts, which are typically used for these production methods.

Specifically, US 2007/0155272 A1 teaches the partial use of yarns which are stretch-resistant as MD yarns of a base fabric for the clothing, that is to say as yarns which extend in the machine direction of the finished clothing. In this case, in US 2007/0155272 A1 "stretch-resistant" refers to yarns whose material has a low elongation at break, namely for example an elongation at break of 1 to 4% with a tenacity of approximately 150 cN/tex of the yarn or an elongation at break of 5 to 7% with a tenacity of approximately 80 cN/tex of the twisted material. In US 2007/0155272 A1, examples of stretch-resistant materials include aromatic polyamides, such as aramids, polyphenylene sulfide (PPS), polyparaphenylene and Kevlar®. Some or all of the MD yarns can also be formed partially from such a stretch-resistant material and partially from non-stretch-resistant materials. In US 2007/0155272 A1, said non-stretch-resistant materials in particular include polyamides.

Although the use of such stretch-resistant materials as MD yarns in the clothing allows for the reliable absorption of the high forces which act on the clothing during operation of a machine for producing fiber cement components, without the clothing stretching to an impermissible extent, these materials and thus the yarns produced therefrom are very expensive.

SUMMARY OF THE INVENTION

It is therefore an object of the present invention to provide a clothing for a machine for producing fiber cement components, which clothing can be produced more cost-effectively than the clothing described in US 2007/0155272 A1 but nevertheless only permits acceptable levels of stretching.

This object is achieved by the features of the independent claims. The dependent claims provide advantageous developments of the invention.

According to a first aspect of the present invention, the generic covering described in the introduction is distinguished by the fact that the MD yarns are heat-treated at a temperature which lies between the melting temperature of the second material and the melting temperature of the first material, such that, after cooling, the at least partially melted second material forms a matrix in which the first multifilaments composed of the first material are embedded. In this way, a composite material is provided, which makes it possible, even with less expensive materials than those described as stretch-resistant materials in US 2007/0155272 A1, to produce yarns having a high tensile strength and a low elongation at break. During the heat treatment, the second material may have been completely melted. However, this is not absolutely necessary; it is sufficient for said second material to be only partially melted as long as, after cooling and solidification, it can at least partially create a bond between the non-melted multifilaments composed of the first material.

Preferably, the MD yarns are produced in a two-stage twisting process, wherein first multifilaments and second multifilaments have initially been subjected to pre-twisting with one another in a first direction of rotation, and subsequently a plurality of the pre-twisted yarns produced in this way have been subjected to final twisting with one another in a second direction of rotation opposite to the first direction of rotation. As a result of the twisting, the tensile strength or tear resistance of the yarns formed thereby generally increases. This effect can be even further increased by the two-stage process. Since the pre-twisted yarn already comprises first and second multifilaments, it is possible to ensure that melted material from the second multifilaments reaches the first multifilaments in a reliable manner in order to connect them to one another.

Although the twisting has the advantage that the tensile strength or tear resistance of the yarns formed thereby is increased, experiments have shown that, with regard to the stretch of the MD yarns and of the clothing formed therefrom, it is advantageous if the degree of twisting is kept very low. It is therefore proposed that the first stage of the twisting process be performed with not more than 236.22 revolutions per meter (=6.0 tpi), preferably not more than 196.85 revolutions per meter (=5.0 tpi), further preferably with not more than 157.48 revolutions per meter (=4.0 tpi), and/or that the second stage of the twisting process be performed with not more than 118.11 revolutions per meter (=3.0 tpi), further preferably not more than 98.43 revolutions per meter (=2.5 tpi), even more preferably not more than 78.74 revolutions per meter (=2.0 tpi). Here, the unit "tpi", known to those skilled in the field of clothings and weaving technology, stands for "twists per inch" or "turns per inch", that is to say revolutions per inch, which can be converted into revolutions per meter.

The fineness of the threads of the first multifilaments and/or of the second multifilaments can be selected such that it is not more than 2400 tex, preferably not more than 2300 tex, further preferably not more than 2200 tex. Here, the unit of measurement "tex" represents the thread weight per unit length. In accordance with ISO 1144 and DIN 60905, 1 tex corresponds to the weight in grams of a thread with a length of 1000 meters. The finer the multifilaments in the starting material for the MD yarns are, the greater the tensile load that the MD yarns produced from said multifilaments can withstand. Firstly, in particular finer multifilaments can be stretched to a greater extent than thicker multifilaments, which has a positive effect on the tensile strength of the material, and, secondly, with a substantially identical outer circumference of the MD yarn, the cross-sectional area which is effectively usable for the transmission of tensile forces can be increased when finer multifilaments are used in comparison to the use of fewer and thicker multifilaments.

It is in particular possible to obtain acceptable results with regard to the stretch of the MD yarns with simultaneously low material costs if the first material is polyamide (PA) and the second material is polypropylene (PP). Whereas polyamides are mentioned explicitly among the non-stretch-resistant materials in the document US 2007/0155272 A1, this relatively cost-effective material can be used according to the present invention as first material, that is to say as the material which has the higher tensile strength and higher melting temperature in the composite material. Polypropylene (PP) typically melts at a temperature between 160° C. and 165° C., whereas polyamides (PA) can have substantially higher melting temperatures. For example, the melting temperature of PA6.6 is around 260° C. In this respect, a temperature in the range of 185° C. to 190° C. can be selected for the heat treatment step, for example.

Those MD yarns in the base structure of the clothing which are formed from first and second multifilaments can in this case have a proportion of 10% by weight to 30% by weight, preferably of 15% by weight to 25% by weight, of the first material. If all of the multifilaments of such an MD yarn, in particular both the first multifilaments and the second multifilaments, have the same fineness (measured in tex), the proportional weight indication corresponds with the proportional number of individual fibers of the first multifilaments in relation to the total number of individual fibers in the starting material of the MD yarn.

The CD yarns interwoven with the MD yarns in the base fabric can be monofilaments.

Preferably, the base fabric is a double-ply fabric, which comprises two systems of MD yarns and one system of CD yarns. Thus, instead of one MD yarn with a relatively large diameter, it is for example possible to use four MD yarns with a substantially smaller diameter, wherein in each case two MD yarns can be arranged in pairs above one another in the fabric. In this way, more uniform dewatering through the clothing can be achieved.

As has already been described in the document US 2007/0155272 A1, a further fabric whose CD yarns have a smaller diameter than the CD yarns of the base fabric and/or whose MD yarns have a smaller diameter than the MD yarns of the base fabric is arranged on that side of the base fabric which faces the fiber cement components to be manufactured. In this way, the high tensile forces which act during operation of the machine for producing fiber cement components can be absorbed primarily by the base fabric, whereas the further fabric has the function of providing a finer surface for the fiber cement components to be manufactured, through which surface more uniform dewatering can be effected. The further fabric can have a higher density of CD yarns and/or MD yarns compared with the base fabric. This further reduces the risk of markings.

In order to increase the water absorption capacity of the clothing, a layer of staple fibers can be provided on one outer side or on both outer sides of said clothing. In the context of the present invention, "outer side" is in this case understood to mean that side of the clothing which faces the fiber cement components to be manufactured or that side of the clothing which is situated opposite said side and which faces away from the fiber cement components to be manufactured. The fastening to the base fabric can be effected for example by needling.

A further aspect of the present invention relates to a production method for the clothing described above, wherein the advantages which have been described with regard to the clothing per se also apply to the method according to the invention, and vice versa.

The present invention therefore also relates to a method for producing a covering which, when used as intended, is used in a machine for producing fiber cement components and which has a base fabric having MD yarns and CD yarns, wherein the method comprises the following steps of: first multifilaments composed of a first material and second multifilaments composed of a second material being subjected to pre-twisting in order to form at least some of the MD yarns, wherein the first material has a higher tensile strength and a higher melting temperature than the second material; and heat-treating the MD yarns at a temperature which lies between the melting temperature of the second material and the melting temperature of the first material, such that, after cooling, the at least partially melted second material forms a matrix in which the first multifilaments composed of the first material are embedded.

Preferably, prior to the heat treatment step, the MD yarns are interwoven with CD yarns in order to create the base fabric. In this way, one method step can be saved, since a heat treatment of the woven base fabric is generally carried out in any case in order for the offsets which arise between MD yarns and CD yarns during weaving to be fixed in place and thus for subsequent stretching to be counteracted. However, according to the present invention, it is important that the temperature for the heat treatment is selected such that it lies between the melting temperature of the second material and the melting temperature of the first material. It is possible to perform the heat treatment step only on the base fabric or else on the otherwise already substantially finished clothing, that is to say after the base fabric has been provided with any further fabric and one or more staple fiber layers.

Preferably, the twisting step comprises two sub-steps, specifically of: first multifilaments being subjected to pre-twisting with second multifilaments in a first direction of rotation, and a plurality of the pre-twisted yarns produced in this way being subjected to final twisting in a second direction of rotation opposite to the first direction of rotation. The two opposite directions of rotation are commonly also described as S direction and Z direction, respectively. In this case, the degree of twisting is preferably selected to be low for the reasons described above.

The invention will be explained in more detail below with reference to schematic drawings which are not true to scale.

DETAILED DESCRIPTION OF THE INVENTION

Figure 1:
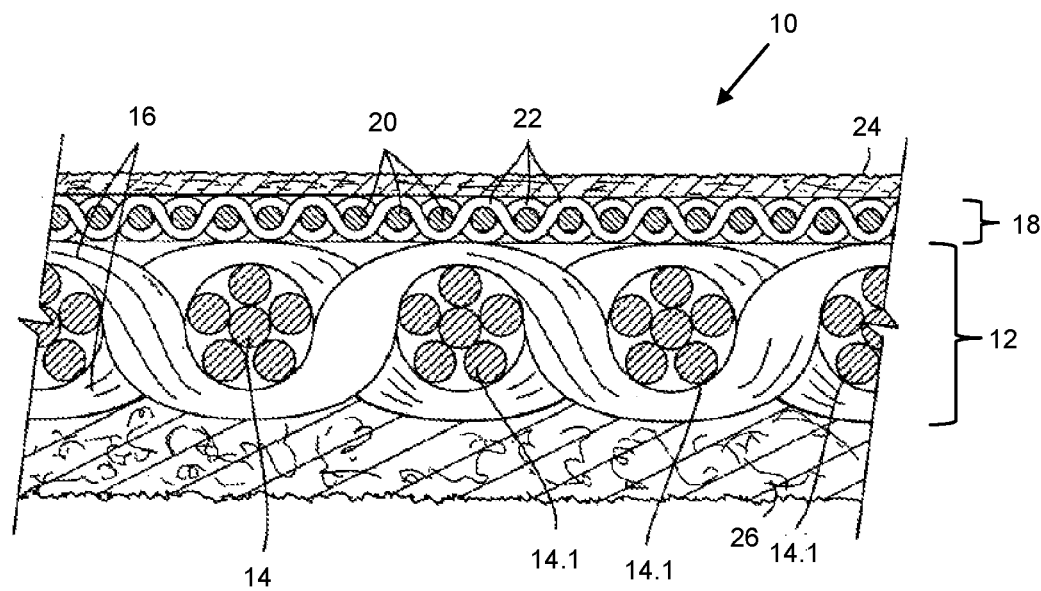
FIG. 1 shows a cross-sectional view through a portion of the clothing according to the invention prior to the heat treatment step.

FIG. 1 shows a schematic cross-sectional view through a portion of the clothing 10 according to the invention for a machine for producing fiber cement components prior to the heat treatment step. A base fabric 12, which is formed from interwoven MD yarns 14 and CD yarns 16, is an essential part of the clothing 10. MD yarns 14 are in this case understood to mean yarns which extend substantially in the machine direction of the clothing 10, that is to say in the running direction of the clothing 10 during intended use. By contrast, CD yarns 16 are understood to mean yarns which extend substantially in the cross-machine direction of the clothing 10, that is to say transverse to the running direction of the clothing 10 during intended use. The base fabric 12 can be woven either in a round or flat manner. In the latter case, longitudinal ends of the base fabric 12 are connected to one another in a seam region in order to make the base fabric 12 continuous. In this case, on the loom, the MD yarns 14 correspond to the warp threads and the CD yarns 16 correspond to the weft threads.

Figure 2:
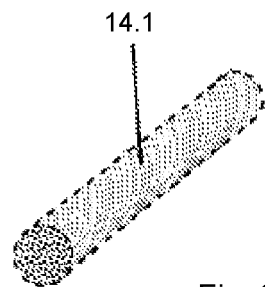
FIG. 2 shows an enlarged portion of a pre-twisted yarn comprising first and second multifilaments.

As can be readily seen in FIG. 1, the MD yarns 14 are composed in each case of a plurality of pre-twisted yarns 14.1. In the present exemplary embodiment, there are shown in each case six pre-twisted yarns 14.1 per MD yarn 14. However, the MD yarns 14 can also comprise a different number of pre-twisted yarns 14.1, in particular fewer pre-twisted yarns 14.1, such as, for example, five or even only four pre-twisted yarns 14.1. As is indicated in FIG. 2, each pre-twisted yarn 14.1 is composed of bundles of first multifilaments and second multifilaments, which are twisted with one another in order to form the pre-twisted yarn 14.1. Preferably, the individual bundles themselves have also already been twisted in order to be able to handle them more easily during the manufacturing operation. However, there should also preferably be a low twist rate here. The material of the first multifilaments differs from the material of the second multifilaments in particular in that said material of the first multifilaments has a higher tensile strength and a higher melting temperature. In the present exemplary embodiment, the first material is polyamide (PA) and the second material is polypropylene (PP).

Initially, the first multifilaments and the second multifilaments are twisted with one another in a first direction of rotation in order to form the pre-twisted yarns 14.1. Preferably, this step is performed with a relatively low twist rate of not more than 236.22 revolutions per meter (=6.0 tpi). The pre-twisted yarns 14.1 thus formed are then subjected to final twisting with one another in a second direction of rotation opposite to the first direction of rotation in order to form the MD yarn 14. Preferably, compared with the first step, this step is performed with an even lower twist rate of not more than 118.11 revolutions per meter (=3.0 tpi). The low twist rates prevent excessive stretching of the MD yarns 14 when said yarns are subjected to tensile loading. Although the twisting increases the tear resistance of the MD yarns, which is why the twist rate should not be zero, an excessive twist rate has a negative effect with respect to the stretch behavior of the MD yarn.

In one specific exemplary embodiment, the MD yarns 14 of the base fabric 12 may be, or may have been, produced by twisting four bundles of second multifilaments having 630 individual fibers composed of polyamide (PA) and one bundle of first multifilaments having 600 individual fibers composed of polypropylene (PP) with one another in a first direction of rotation with a twist rate of 196.85 revolutions per meter (=5.0 tpi) to give a pre-twisted yarn 14.1, and then twisting five such pre-twisted yarns 14.1 with one another in a second direction of rotation opposite to the first direction of rotation with a twist rate of 98.43 revolutions per meter (=2.5 tpi). In this exemplary embodiment, all of the individual threads of the first and second multifilaments can have a fineness of 1991 tex.

In another specific exemplary embodiment, as an alternative, the MD yarns 14 of the base fabric 12 may be, or may have been, produced by twisting three bundles of second multifilaments having 1260 individual fibers composed of polyamide (PA) and one bundle of first multifilaments having 600 individual fibers composed of polypropylene (PP) with one another in a first direction of rotation with a twist rate of 128.74 revolutions per meter (=3.27 tpi) to give a pre-twisted yarn 14.1, and then twisting four such pre-twisted yarns 14.1 with one another in a second direction of rotation opposite to the first direction of rotation with a twist rate of 70.87 revolutions per meter (=1.8 tpi). In this exemplary embodiment, all of the individual threads of the first and second multifilaments can have a fineness of 2103 tex.

In yet another specific exemplary embodiment, as an alternative, the MD yarns 14 of the base fabric 12 may be, or may have been, produced by twisting two bundles of second multifilaments having 1890 individual fibers composed of polyamide (PA) and one bundle of first multifilaments having 846 individual fibers composed of polypropylene (PP) with one another in a first direction of rotation with a twist rate of 149.61 revolutions per meter (=3.8 tpi) to give a pre-twisted yarn 14.1, and then twisting four such pre-twisted yarns 14.1 with one another in a second direction of rotation opposite to the first direction of rotation with a twist rate of 90.55 revolutions per meter (=2.3 tpi). In this exemplary embodiment, all of the individual threads of the first and second multifilaments can have a fineness of 2167 tex.

In FIG. 1, the base fabric 12 is illustrated as a single-ply fabric but it can also be a double-ply fabric. With regard to dewatering, experiments have proven it to be particularly advantageous if the base fabric 12 is a double-ply fabric having a two system of MD yarns 13 and one system of CD yarns 16.

As can furthermore be seen in FIG. 1, the clothing 10 can also comprise a further fabric 18. This fabric is also composed of MD yarns 20 and CD yarns 22 which are interwoven, preferably using plain weave. However, the MD yarns 20 and the CD yarns 22 of the further fabric have a markedly smaller diameter than the MD yarns 14 and CD yarns 16 of the base fabric. The main function of the further fabric 18 is to support the fiber cement components being formed thereon over as large an area as possible and to ensure very uniform dewatering. An upper layer of staple fibers 24 can also be arranged on that outer side of the clothing 10 which faces the fiber cement components to be formed (at the top in FIG. 1). Likewise, a lower layer of staple fibers 26 can be arranged on that outer side of the clothing 10 which faces away from the fiber cement components to be formed (at the bottom in FIG. 1). The two layers of staple fibers 24, 26 can be connected to the base fabric 12 and/or to the further fabric 18 by needling, for example. Said staple fiber layers are used to assist the dewatering during the production process of the fiber cement components.

Figure 3:
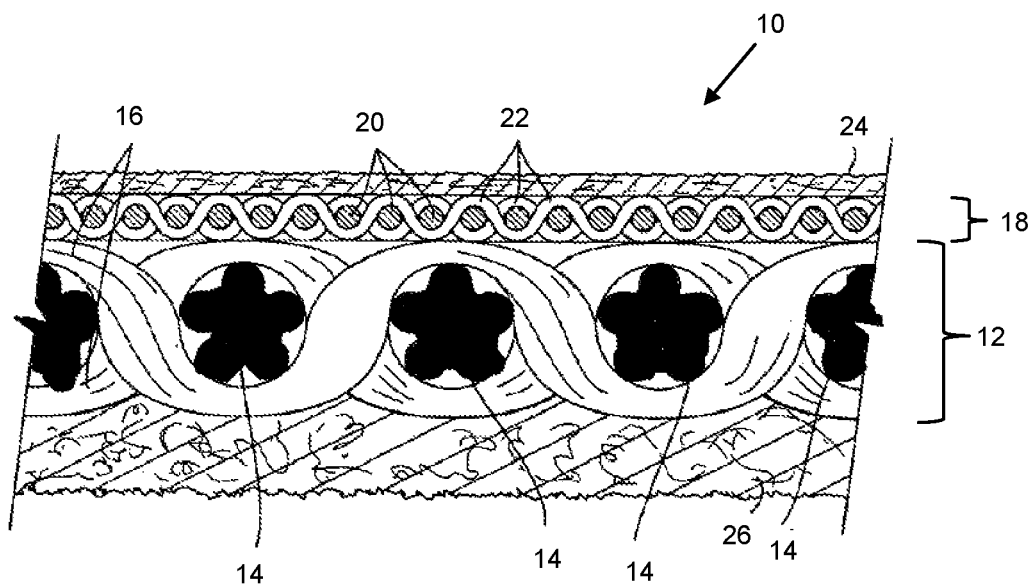
FIG. 3 shows a cross-sectional view like in FIG. 1, but after the heat treatment step.

FIG. 3 shows the same schematic cross-sectional view as FIG. 1 but with the difference that, in this view, the MD yarns 14 of the base fabric 12 have already been heat-treated. In this case, the heat treatment was carried out at a temperature which lies above the melting temperature of the second material of the second multifilaments, that is to say above the melting temperature of polypropylene (PP), but below the melting temperature of the first material of the first multifilaments, that is to say below the melting temperature of polyamide (PA). The heat treatment may have been carried out for example at a temperature of 190° C. This has the result that the second material at least partially melts and then, upon solidification, forms a matrix in which the first multifilaments composed of the first material, which has not melted, are embedded. A composite material is thus obtained which permits only relatively low levels of stretching in spite of the use of relatively inexpensive starting materials. In this connection, the phrase "form a matrix" should be understood in the broad sense. It may of course be that the first multifilaments are completely enclosed by the melted second material. However, this is not absolutely necessary; it is generally sufficient for the second material to become so soft in the heat treatment step that it acts as an adhesive in order to at least partially connect the first multifilaments to one another.

LIST OF REFERENCE DESIGNATIONS

10 Clothing
12 Base fabric
14 MD yarn (of the base fabric)
14.1 Pre-twisted yarn
16 CD yarn (of the base fabric)
18 Further fabric
20 MD yarn (of the further fabric)
22 CD yarn (of the further fabric)
24 Upper layer of staple fibers
26 Lower layer of staple fibers

The invention claimed is:

1. A clothing for a machine for producing fiber cement components, the clothing comprising:
    a base fabric including MD yarns and CD yarns, at least some of said MD yarns being formed from first multifilaments composed of a first material and second multifilaments composed of a second material, said first and second multifilaments being twisted together, said first material having a higher tensile strength and a higher melting temperature than said second material;
    said second material being at least partially melted, by heat-treatment of said MD yarns at a temperature between a melting temperature of said second material and a melting temperature of said first material and cooling, to form a matrix, and said first multifilaments formed of said first material being embedded in said matrix; and
    a further fabric disposed on a side of said base fabric facing the fiber cement components to be produced, said further fabric including at least one of:
        CD yarns having a smaller diameter than said CD yarns of said base fabric, or
        MD yarns having a smaller diameter than said MD yarns of said base fabric.

2. The clothing according to claim 1, wherein said first multifilaments and said second multifilaments of said MD yarns are pre-twisted with one another in a first direction of rotation as a first stage, and a plurality of said pre-twisted yarns are twisted with one another in a second direction of rotation opposite to said first direction of rotation as a second stage.

3. The clothing according to claim 2, wherein at least one of said first stage having not more than 236.22 revolutions per meter or said second stage having not more than 118.11 revolutions per meter.

4. The clothing according to claim 2, wherein at least one of said first stage having not more than 196.85 revolutions per meter or said second stage having not more than 98.43 revolutions per meter.

5. The clothing according to claim 2, wherein at least one of said first stage having not more than 157.48 revolutions per meter or said second stage having not more than 78.74 revolutions per meter.

6. The clothing according to claim 1, wherein at least one of said first multifilaments or said second multifilaments have threads with a fineness of not more than 2400 tex.

7. The clothing according to claim 1, wherein at least one of said first multifilaments or said second multifilaments have threads with a fineness of not more than 2300 tex.

8. The clothing according to claim 1, wherein at least one of said first multifilaments or said second multifilaments have threads with a fineness of not more than 2200 tex.

9. The clothing according to claim 1, wherein said first material is polyamide and said second material is polypropylene.

10. The clothing according to claim 1, wherein said MD yarns formed from said first and second multifilaments have a proportion of 10% by weight to 30% by weight of said first material.

11. The clothing according to claim 1, wherein said MD yarns formed from said first and second multifilaments have a proportion of 15% by weight to 25% by weight of said first material.

12. The clothing according to claim 1, wherein said CD yarns are monofilaments interwoven with said MD yarns in said base fabric.

13. The clothing according to claim 1, wherein said base fabric is a double-ply fabric including two systems of said MD yarns and one system of said CD yarns.

14. A clothing for a machine for producing fiber cement components, the clothing comprising:
    a base fabric including MD yarns and CD yarns, at least some of said MD yarns being formed from first multifilaments composed of a first material and second multifilaments composed of a second material, said first and second multifilaments being twisted together, said first material having a higher tensile strength and a higher melting temperature than said second material;
    said second material being at least partially melted, by heat-treatment of said MD yarns at a temperature between a melting temperature of said second material and a melting temperature of said first material and cooling, to form a matrix, and said first multifilaments formed of said first material being embedded in said matrix;
    two outer sides of the clothing; and
    a layer of staple fibers disposed on one or both of said outer sides of the clothing.

15. A method for producing a clothing, including a base fabric having MD yarns and CD yarns, to be used in a machine for producing fiber cement components, the method comprising:
    pre-twisting first multifilaments composed of a first material and second multifilaments composed of a second material to form at least some of the MD yarns, the first material having a higher tensile strength and a higher melting temperature than the second material;
    heat-treating the MD yarns at a temperature between a melting temperature of the second material and a melting temperature of the first material to form a matrix from the at least partially melted second material and to embed the first multifilaments composed of the first material in the matrix after cooling; and
    applying a further fabric on a side of the base fabric facing the fiber cement components to be produced, the further fabric including at least one of:
        CD yarns having a smaller diameter than the CD yarns of the base fabric, or
        MD yarns having a smaller diameter than the MD yarns of the base fabric.

16. The method according to claim 15, which further comprises, prior to the heat treatment, interweaving the MD yarns with the CD yarns to create the base fabric.

17. The method according to claim 15, which further comprises carrying out the twisting by:
- pre-twisting the first multifilaments with the second multifilaments in a first direction of rotation; and
- finally twisting a plurality of the pre-twisted yarns in a second direction of rotation opposite to the first direction of rotation.

18. A method for producing a clothing, including two outer sides and a base fabric having MD yarns and CD yarns, to be used in a machine for producing fiber cement components, the method comprising:
- pre-twisting first multifilaments composed of a first material and second multifilaments composed of a second material to form at least some of the MD yarns, the first material having a higher tensile strength and a higher melting temperature than the second material;
- heat-treating the MD yarns at a temperature between a melting temperature of the second material and a melting temperature of the first material to form a matrix from the at least partially melted second material and to embed the first multifilaments composed of the first material in the matrix after cooling; and
- applying a layer of staple fibers on one or both of the outer sides of the clothing.

\* \* \* \* \*